Figure 8:
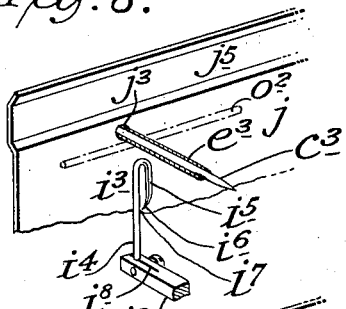

B. SANER.
EMBROIDERING MACHINE.
APPLICATION FILED OCT. 2, 1912. RENEWED NOV. 8, 1913.
1,100,152.
Patented June 16, 1914.
3 SHEETS—SHEET 1.
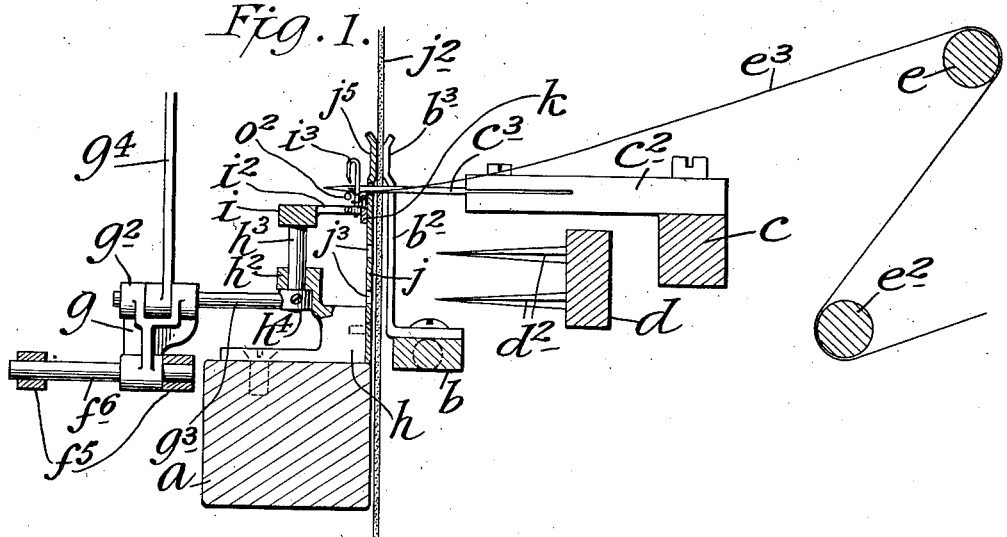
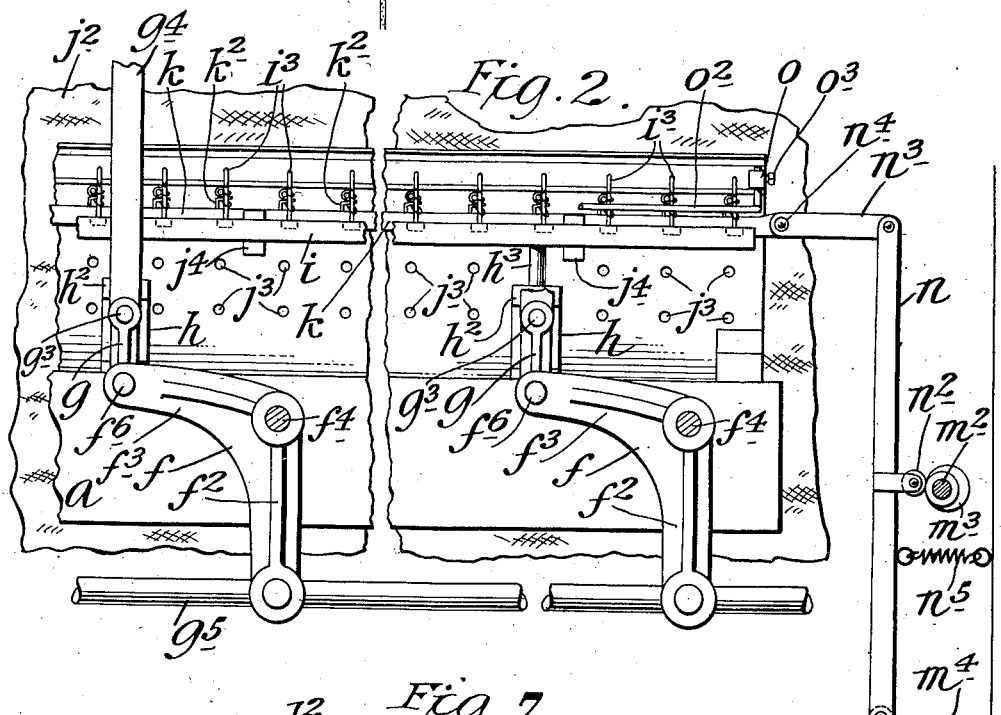
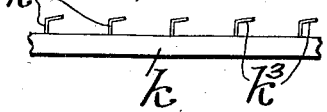
WITNESSES
A. R. Appleman
S. Andrews
INVENTOR
Basil Saner
BY
Edgar Tate &Co.
ATTORNEYS.

B. SANER.
EMBROIDERING MACHINE.
APPLICATION FILED OCT. 2, 1912. RENEWED NOV. 8, 1913.
1,100,152.
Patented June 16, 1914.
3 SHEETS—SHEET 2.
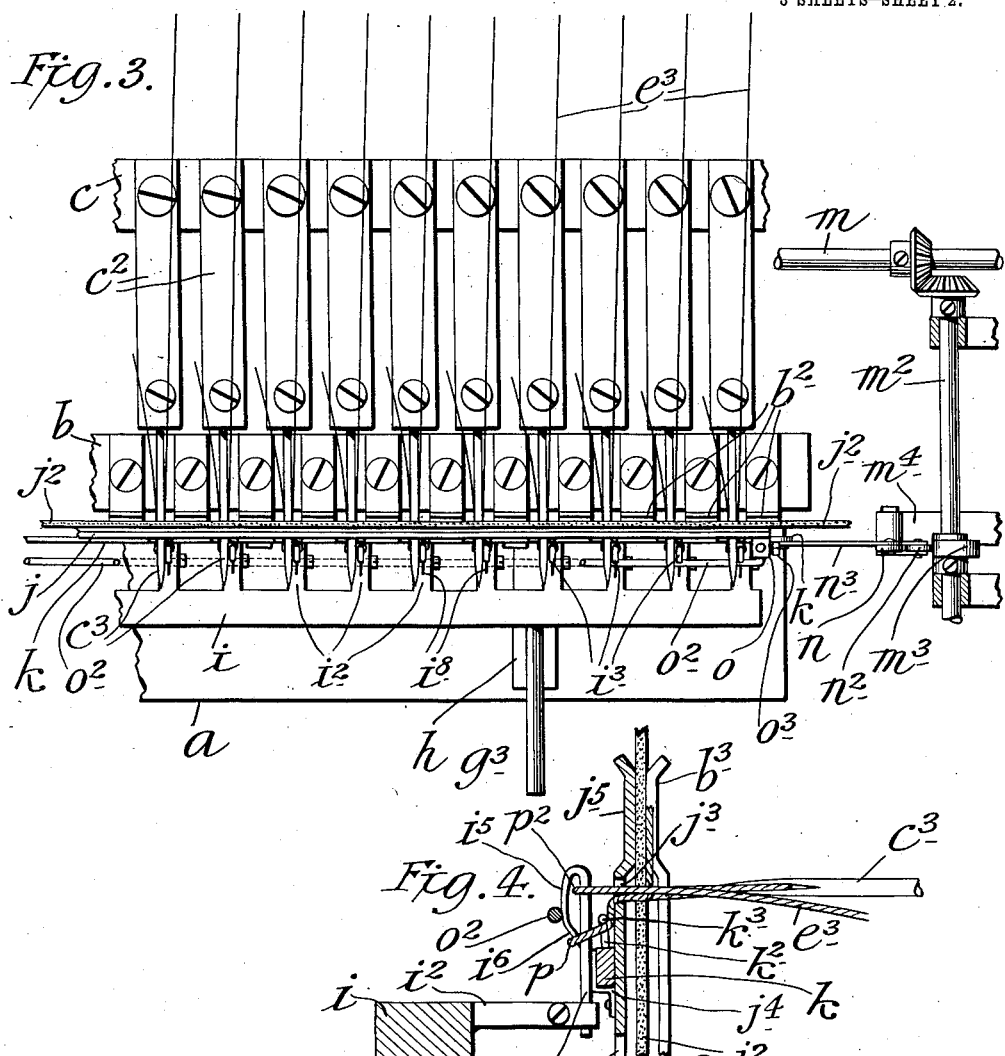
WITNESSES
INVENTOR B. SANER.
EMBROIDERING MACHINE.
APPLICATION FILED OCT. 2, 1912. RENEWED NOV. 8, 1913.

1,100,152.

Patented June 16, 1914.

3 SHEETS—SHEET 3.

WITNESSES
A. N. Appleman
S. Andrews

INVENTOR,
Basil Saner,
BY
Edgar Tate & Co.
ATTORNEYS.

UNITED STATES PATENT OFFICE.

BASIL SANER, OF WEST NEW YORK, NEW JERSEY.

EMBROIDERING-MACHINE.

1,100,152. Specification of Letters Patent. Patented June 16, 1914.

Application filed October 2, 1912, Serial No. 723,480. Renewed November 8, 1913. Serial No. 799,992.

*To all whom it may concern:*

Be it known that I, BASIL SANER, a citizen of the United States, and residing at West New York, in the county of Hudson and State of New Jersey, have invented certain new and useful Improvements in Embroidering-Machines, of which the following is a specification, such as will enable those skilled in the art to which it appertains to make and use the same.

This invention relates to embroidering machines, and particularly to what are known as Swiss and German embroidering machines, and the object thereof is to improve a machine of this class by doing away with the shuttle and bobbin devices and the mechanism for operating the same, and substituting therefor a novel stitch forming mechanism whereby the operation of embroidering any design on a cloth or fabric may be performed with a single thread where two have heretofore been employed, and whereby an improved lock-chain stitch is formed which consists of a single thread on one side of the cloth or fabric and a double thread on the opposite side of the cloth or fabric, and whereby both the construction and operation of the machine is cheapened and simplified and the operation and results produced improved, and with this and other objects in view the invention consists in an embroidering machine of the class specified constructed and operating as hereinafter described and claimed.

The invention is fully disclosed in the following specification of which the accompanying drawing forms a part, in which the separate parts of my invention are designated by suitable reference characters in each of the views, and in which:—

Figure 1 is a transverse sectional view through an embroidering machine of the class specified, but showing only certain details of the machine as originally constructed and my improvements in connection therewith;—Fig. 2 a rear view of the construction shown in Fig. 1, Fig. 3 a plan view of the construction shown in Fig. 2 with certain parts omitted;—Fig. 4 a fragmentary view similar to Fig. 1 but showing the parts on an enlarged scale and in a different position;—Fig. 5 a front view of a part of a cloth or fabric sheet, and showing a line of stitches produced by a single needle and a corresponding looper hook;—Fig. 6 a view similar to Fig. 5 but showing the reverse side of the cloth or fabric sheet;—Fig. 7 a side view of a part of a finger bar which I employ, and Figs. 8 to 16 inclusive are detail views showing different steps in the process of forming a lock-chain stitch.

In the accompanying drawing, I have shown only such parts of the original machine as are necessary to illustrate and describe the construction and operation of my improvement, and in Figs. 1, 2 and 3 of the accompanying drawing, I have shown at $a$ the shuttle bar of a machine of the class specified, or the bar in connection with which the ordinary shuttles have heretofore been mounted, and it will be understood that this bar is stationary and extends from one end of the machine to the other. I have also shown at $b$ the presser finger bar which carries the presser fingers $b^2$, and the bar $b$ has a slight rotary movement in opposite directions and extends the full length of the machine, and this bar with its fingers $b^2$ are the same as in the original machine, and in practice, a large number of the fingers $b^2$ are employed. I have also shown at $c$ the usual needle bar which also extends the full length of the machine, and is provided with the usual needle brackets $c^2$ having the usual needles $c^3$, and the bar $c$ has a forward and backward movement, and the needle brackets $c^2$ and needles $c^3$ correspond in number with the presser fingers $b^2$. I have also shown at $d$ the borer bar which extends the full length of the machine, and has a forward and backward movement, and which is provided with the usual borer needles $d^2$ which are arranged in pairs in separate vertical planes, between the presser fingers $b^2$. I have also shown at $e$ and $e^2$ the ordinary thread guide rods which extend the full length of the machine and over and around which the threads $e^3$ are passed, and it will be understood that a thread $e^3$ is employed in connection with each of the needles $c^3$, and the thread guide rods $e$ and $e^2$ also have a forward and backward movement, in the operation of the machine, in order to take up or regulate the slack or tension of the threads $e^3$, and it will be understood that each of the threads $e^3$ is wound on a bobbin suitably supported at the front of the machine in the usual manner.

Supported at the back of the machine and at the rear of the shuttle bar $a$ are a plurality of equally spaced bell cranks $f$ having downwardly directed arms $f^2$ and laterally directed arms $f^3$. The supports of these bell cranks are indicated at $f^4$, in Fig. 2 only, but it will be understood that these bell cranks form a part of the old machine and are supported in the usual manner.

The laterally directed arms $f^3$ of the bell cranks $f$ are forked, the separate members of said arms being shown at $f^5$ in Fig. 1, and mounted in the forked ends of said bell cranks are pins $f^6$, and mounted on the pins $f^6$ are links $g$ having forked heads $g^2$ through which are passed pins $g^3$, and mounted on the pins $g^3$ in the forked heads of the links $g$ are bars $g^4$.

In the original machine the parts $a$, $b$, $c$ and $d$ with their connections are all duplicated, one series of said parts being above the other, and the bars $g^4$ extend upwardly and are connected with the upper series of said parts so that the said series are operated simultaneously, and it will be understood that the bell cranks $f$ and the parts $f^6$, $g$ and $g^4$ are all of the usual construction, and there is one of the bars $g^4$ employed in connection with each of the bell cranks $f$ and said bell cranks are operated by a horizontally reciprocating rod $g^5$, in the usual manner.

In the practice of my invention, I secure to the top of the shuttle bar $a$ and transversely thereof a series of brackets $h$ which correspond in number with the cranks $f$ and are provided with raised, backwardly directed heads $h^2$ in which are mounted vertically arranged pins $h^3$.

The inner ends of the pins $g^3$ are provided with heads $h^4$ in which the lower ends of the pins $h^3$ are secured, and secured to the upper ends of the pins $h^3$ is a bar $i$ which extends the full length of the machine, and in the operation of the machine the pins $g^3$ and $h^3$ are given a vertical movement as is also the bar $i$.

The bar $i$ is provided with a plurality of backwardly directed looper hook supporting arms $i^2$ which correspond in number with the needles $c^3$, and each of these arms is provided with a vertically arranged looper hook $i^3$ comprising a vertical shank portion $i^4$ and downwardly directed hook members $i^5$ composed of spring or resilient material and having an inwardly directed point $i^6$ between which and the shank, under normal conditions, is a space $i^7$. The end of the arms $i^2$ are provided in their ends with curfs, as shown at $i^8$, in which the shanks $i^4$ of the looper hooks $i^3$ are secured by a clamp screw or in any other suitable way. I also provide a cloth plate $j$ which extends the full length of the machine and is secured to the brackets $h$ in a vertical position corresponding with the position of the presser fingers $b^2$ and between which and said fingers the cloth or fabric $j^2$ to be operated upon, or embroidered, is placed or supported and make movable in the usual manner.

The plate $j$ is provided with a plurality of apertures $j^3$ which are arranged in horizontal and vertical rows, and the apertures in the vertical rows are three in number, the top apertures being for the needles $c^3$ and the bottom apertures being for the borers $d^2$.

Secured to the back face of the cloth plate $j$ between the upper horizontal rows of apertures $j^3$ are brackets $j^4$ in which is mounted a longitudinally intermittently reciprocating finger bar $k$ provided with a plurality of fingers $k^2$ which correspond in number with the looper hooks $i^3$ and the needles $c^3$ and operate in connection therewith as hereinafter described, and the fingers $k^2$ are composed of vertically arranged shank members and laterally directed, inclined puller hook members $k^3$. I have also shown at $m$ the main drive shaft of the machine and in the practice of my invention, I gear in connection therewith a horizontal cam shaft $m^2$, this construction being clearly shown in Fig. 3, and this shaft is provided with a cam disk $m^3$, and at one side of the cam shaft $m^2$ is a bracket $m^4$ to which is pivoted a cam operated lever $n$. The lever $n$ is provided with an anti-friction roller $n^2$ in connection with which the cam $m^3$ operates, and the upper end of said lever is provided with a link $n^3$ which is pivoted at $n^4$ to the finger bar $k$, and the lever $n$ is also provided with a pull spring $n^5$ which normally holds the roller $n^2$ in engagement with the cam $m^3$.

At the ends of the cloth plate $j$ are brackets $o$ in which is supported a horizontal hook closing bar $o^2$ which lies in a plane beneath that of the needles $c^3$, as clearly shown in Figs. 1, 2 and 4, and said bar is adjustable vertically in the brackets $o$ by means of set screws $o^3$ or in any other suitable way.

The upper ends of the puller fingers $b^2$ are provided with inwardly set parts $b^3$, and the upper edge portion of the cloth plate $j$ is provided with corresponding inwardly set longitudinal portions $j^5$ between which the cloth or fabric sheet $j^2$ is held and immediately below which the needles $c^3$ operate, and the object of this construction is to hold said sheet in proper position without interfering with the movement thereof.

In the operation of the machine the needles $c^3$ are threaded in the usual manner, and the position of the cloth or fabric sheet $j^2$ adjusted as desired. It will be understood that the fabric sheet $j^2$ to be embroidered is supported in a frame which extends the full length of the machine and which is operated by a pantograph device in the usual manner, said frame and pantograph being not shown. It will also be understood that the borers or borer needles operate in the same manner as in other machines of this class, and in their operation pass through the corresponding apertures $j^3$ in the plate $j$.

Figure 12:
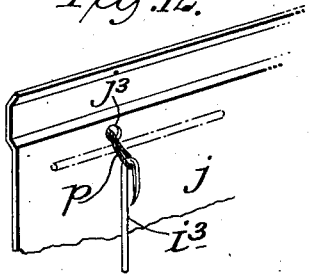
Figure 9:
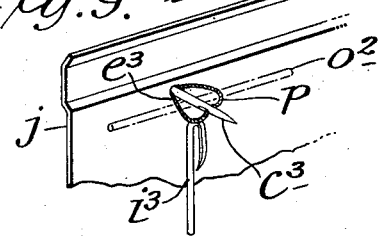
Figure 13:
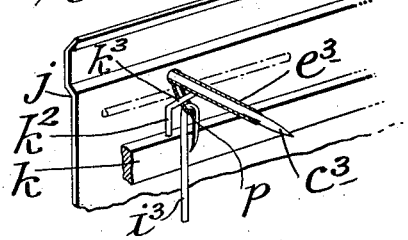
Figure 10:
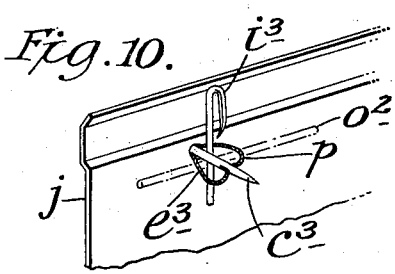
Figure 14:
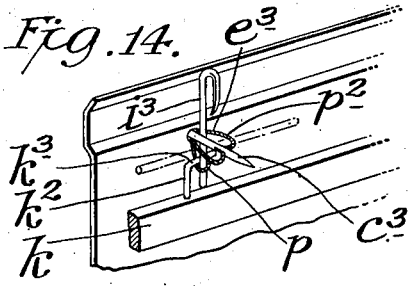
Figure 11:
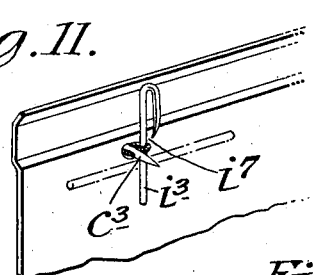
Figure 15:
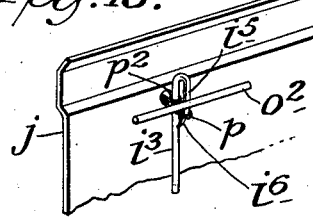
Figure 16:
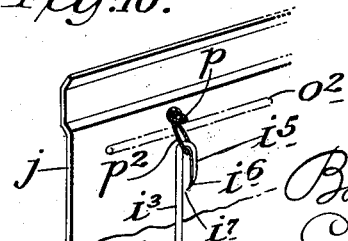

In the first movement of the various parts of the machine in the beginning of the process of embroidering, the needles $c^3$ and looper hooks $i^3$ are thrown into the position shown in Fig. 8, which is the position assumed at the beginning of the formation of a stitch, and at which time the needles $c^3$ are at the limit of their projection through the cloth plate, and the looper hooks are in their lowest position caused by rocking the bell cranks $f$ through the rod $g^5$. The planes of the looper hooks $i^4$ are parallel with and at one side of the planes of the needles and in the second step or movement in the formation of a stitch or stitches, the needles are drawn backwardly, as shown in Fig. 9, or in the direction of the front of the machine and the loops $p$ are formed in the threads on the back sides of the cloth plate $j$. In the next step or movement the looper hooks $i^3$ are raised as shown in Fig. 10, while the needles remain stationary and the hook members of the looper hooks are passed vertically through the thread loops $p$, and in the next movement or step, as shown in Fig. 11, the looper hook remains stationary while the needle points are drawn farther back and the loops $p$ are drawn tightly around the shanks of the looper hooks. In the next step or movement, as shown in Fig. 12, the needles are entirely withdrawn from the cloth plate $j$ and the looper hooks are drawn back into their lowest position, and in this operation the thread loops $p$ pass into the bottom of the hook members of the looper hooks and are drawn downwardly below the plane of the needles and below the hook closing bar or rod $o^2$. In the next step or movement, as shown in Fig. 13, the bar $k$ is moved to the right and the puller fingers $k^2$ are also drawn to the right and the hook members $k^3$ thereof pass over the thread loops $p$, as shown in Figs. 1, 4 and 13, and at the same time the needles $c^3$ are projected again, as shown in Figs. 8 and 13, and in the next step or movement, as shown in Fig. 14, the needles are partially drawn back and the looper hooks raised thus forming new thread loops $p^2$ through which the looper hooks $i^3$ are passed while the fingers $k^2$ remain as shown in Fig. 13. In the next step or movement the needles are entirely withdrawn and the puller fingers $k^2$ are moved to the left and withdrawn from their engagement with the thread loops $p$, and the looper hooks $i^3$ assume the position shown in Fig. 15, and in this operation the bar $o^2$ closes the hooks $i^5$ by pressing the points thereof inwardly against the shanks $i^4$ of the looper hooks $i^3$, and as the looper hooks $i^3$ descend, as shown in Fig. 16, the loops $p$ ride up over the hooks $i^5$ and are drawn backwardly through the cloth plate, as indicated in said figure, and as this operation continues, the stitches $p^3$, shown in Figs. 5 and 6, are formed, said stitches involving one thread on one side of the fabric and two threads on the other side, said stitches being all formed from the single needle thread.

It must be understood that while I have shown and described only such parts of the old machine or machines as are necessary in order to make clear the construction and operation of my improvement, I have not shown all of the old machine or machines and with the exception of the details of my improvement as herein shown and described, and as hereinafter claimed, the said machine or machines are constructed and operated as heretofore.

Having fully described my invention, what I claim as new and desire to secure by Letters Patent, is;—

1. An embroidering machine provided with the usual thread needles, borer needles and presser fingers, an apertured cloth plate extending longitudinally of the machine and in connection with which the presser fingers operate and between which and said presser fingers the cloth to be embroidered is placed, vertically movable looper hooks operating in connection with said needles and having downwardly directed spring hook members, a longitudinally reciprocating finger bar provided with hook fingers which operate in connection with the needles and the looper hooks, and a hook closure bar which ranges longitudinally of the cloth plate and which operates to close the hook members of the looper hooks.

2. An embroidering machine provided with reciprocating needles arranged in a horizontal plane, vertically movable looper hooks operating in connection with said needles and a longitudinally reciprocating finger bar provided with pull fingers operating in connection with said needles and looper hooks to form lock-chain stitches.

3. An embroidering machine provided with reciprocating needles arranged in a horizontal plane, vertically movable looper hooks operating in connection with said needles and provided at their upper ends with downwardly directed resilient hook members, a longitudinally reciprocating finger bar provided with pull fingers which operate in connection with the looper hooks and needles, and a horizontal hook closure bar which operates to force the points of the resilient hook members inwardly.

4. In an embroidering machine, the combination with horizontally movable needles vertically movable looper hooks, having downwardly directed resilient hook members, of a horizontal rod mounted adjacent thereto and adapted to force the resilient hook members inwardly when the looper hooks move downwardly.

5. The combination in an embroidering machine, provided with the usual horizontally arranged thread needles, borer needles and presser fingers, of a cloth plate ranging longitudinally of the machine and between which and the presser fingers the cloth to be embroidered is placed, said thread needles and borer needles being movable through said cloth plate, vertically movable looper devices operating in connection with said needles and horizontally movable puller devices operating in connection with the loops formed by said looper devices.

6. In an embroidering machine of the class described, a vertically arranged cloth plate, needles arranged horizontally on one side of said plate and movable therethrough, vertically movable looper devices arranged on the opposite side of said plate and horizontally movable puller devices mounted between the looper devices and the cloth plate.

7. In an embroidering machine of the class described, a vertically arranged cloth plate, needles arranged in a horizontal plane on one side of said plate and movable therethrough, vertically movable looper devices arranged on the opposite side of said plate and a horizontally movable bar mounted between the looper devices and said plate, and provided with puller devices which operate in connection with said looper devices.

8. In an embroidering machine of the class described, a vertical cloth plate, thread needles arranged in a horizontal plane on one side of said plate and movable therethrough, vertically movable looper devices arranged on the opposite side of said plate, said looper devices being hook-shaped in form and horizontally movable pulling devices operating between the looper devices and said plate.

In testimony that I claim the foregoing as my invention I have signed my name in presence of the subscribing witnesses this 30th day of September, 1912.

BASIL SANER.

Witnesses:
ROMAN SUTTEY,
A. R. APPLEMAN.

---

Copies of this patent may be obtained for five cents each, by addressing the "Commissioner of Patents, Washington, D. C."